United States Patent Office 3,758,422
Patented Sept. 11, 1973

3,758,422
OXYALKYLATED DERIVATIVES OF PHENOLPHTHALEIN
Bruce N. Wilson, Heath, Ohio, and Raymond R. Hindersinn, Lewiston, N.Y., assignors to Hooker Chemical Corporation, Niagara Falls, N.Y.
No Drawing. Continuation-in-part of abandoned application Ser. No. 694,037, Dec. 28, 1967. This application Apr. 12, 1971, Ser. No. 133,449
Int. Cl. C08g 23/10
U.S. Cl. 260—47 EQ
7 Claims

ABSTRACT OF THE DISCLOSURE

Novel derivatives of phenolphthalein are prepared by reacting the compound with ammonia or an amine, and with ammonia or an amine, followed by a 1,2-epoxide. Such polyhydric derivatives of phenolphthalein are useful in the preparation of polyurethane compositions such as foams, coatings and elastomers, for the production of saturated alkyd resins, unsaturated polyesters, and as intermediates in the preparation of other polymer compoitions.

This is a continuation-in-part of copending application Ser. No. 694,037, filed Dec. 28, 1967, now abandoned.

SUMMARY OF THE INVENTION

This invention relates to reaction products of compositions having the following formulae:

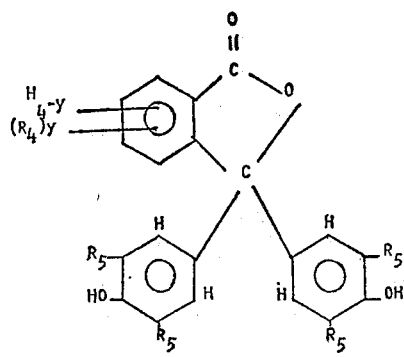

wherein $y$ is a number from 0 to 4; $R'$ is hydrogen, hydrocarbyl, hydroxy-substituted hydrocarbyl or mercapto-substituted hydrocarbyl; $R_4$ is chlorine, bromine or alkyl of 1 to 12 carbon atoms, and $y$ is 1 to 4 when $R_4$ is chlorine or bromine and $y$ is 1 when $R_4$ is alkyl; and $R_5$ is hydrogen, chlorine, bromine, iodine or alkyl of 1 to 6 carbon atoms.

The foregoing compounds are useful in the preparation of polymer compositions such as polyurethane compositions including polyurethane foams, coating compositions and polyurethane elastomers; polyester resins including saturated alkyd resins and unsaturated polyester resins, and as intermediates in the preparation of other polymer compositions and compounds.

DESCRIPTION OF EMBODIMENTS

The compounds of the invention can be prepared from phenolphthalein or substituted phenolphthaleins of the formula:

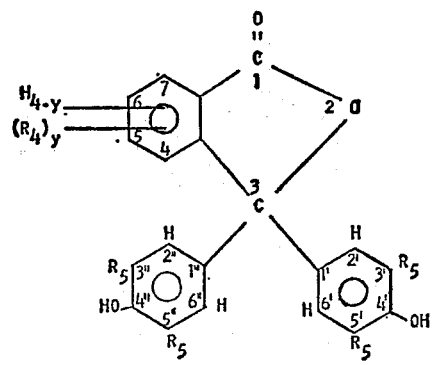

wherein $R_4$, $R_5$ and $y$ are as defined hereinbefore. Illustrative examples of substituted phenolphthaleins are as follows, wherein the substituents are numbered in accordance with the notation on the foregoing formula: 4,5,6,7-tetrachlorophenolphthalein, 4,5,6,7 - tetrabromophenolphthalein, 3',3''-dibromophenolphthalein, 3',3''-dichlorophenolphthalein, 3',5',3'',5''-tetrabromophenolphthalein, 3',5',3'',5'' - tetrachlorophenolphthalein, 3',5',3'',5''-tetraiodophenolphthalein, 4,5,6,7-tetrachloro-3',5',3'',5''-tetrabromophenolphthalein, 6-methylphenolphthalein, 5-propylphenolphthalein, 5 - dodecylphenolphthalein, 5-hexylphenolphthalein, 3',3''-dimethylphenolphthalein, 3',3''-dihexylphenolphthalein, 5',5'' - dibromo-3',3''-dimethylphenolphthalein, and the like.

The hydrocarbyl groups of the hydroxyalkylation agents used in the invention generally have 2 to 18 carbon atoms, more usually 2 to 6 carbon atoms. The hydrocarbyl radicals represented by $R'$ generally have 1 to 8 carbon atoms. The alkyl groups represented by $R_4$ generally have 1 to 12 carbon atoms; the alkyl groups represented by $R_5$ have 1 to 6 carbon atoms. Typical hydrocarbyl radicals include alkyl such as methyl, ethyl, propyl, isobutyl, amyl, octyl, decyl, dodecyl, octadecyl, and halogen substituted alkyls such as chloromethyl, trichloromethyl, fluoropropyl, bromobutyl, iodopropyl, chlorooctyl, bromododecyl and the like; alkenyl such as vinyl, allyl, butenyl, hexenyl, octenyl, dodecenyl, and halogen-substituted alkenyls such as trichlorovinyl, 2-chloroallyl, 2,3-difluorobutenyl, 2,3-dichlorododeconyl, and the like; aryl, alkylaryl and arylalkyl of 6 or 7 to 14 carbon atoms, preferably 6 or 7 to 10 carbon atoms, such as phenyl, naphthyl, anthracyl, benzyl, cresyl, tolyl, xylyl, styryl, and halogen-substituted aryl radicals such as 4-chlorophenyl, 2,4 - dichlorophenyl, 4 - bromophenyl, 1-chloronaphthyl, and the like; and alicyclic radicals of 3 to about 12 carbon atoms, preferably 3 to 6 carbon atoms, such as cyclopropyl, cyclopentyl, cyclohexyl, cyclooctyl, cyclododecyl, and the like.

The succeeding description is directed to phenolphthalein as a starting material, but it is understood that the substituted phenolphthaleins are also intended.

The compositions of the invention are prepared by reacting phenolphthalein with the compound $NH_2R'$, followed by reaction with a hydroxyalkylation agent such as a mono oxirane ring compound, an alkylene halohydrin or an alkylene carbonate. Monomeric 1,2-epoxides having 2 to 18 carbon atoms are preferred. Examples of monoepoxides that can be employed are ethylene oxide, propylene oxide, butylene oxide, cyclohexane oxide, 2,3-epoxyhexane, epichlorohydrin, styrene oxide, allyl glycidyl ether, methyl glycidyl ether, butyl glycidyl sulfide, glycidyl methyl sulfone, glycidyl methacrylate, glycidyl allyl phthalate, and the like. The preferred monoepoxides are the mono-epoxide-substituted hydrocarbons, the mono-epoxy-substituted ethers, sulfides, sulfones and esters wherein the said compounds contain 2 to 18 carbon atoms. Minor amounts of diepoxides can also be incorporated into the compositions. Typical diepoxides are 3,4 - epoxy-6-methylcyclohexylmethyl-3,4-epoxy-6-methylcyclohexane carboxylate, dicyclopentadiene dioxide, limonene dioxide, 4,4'-(diglycidyl) diphenylpropane, vinylcyclohexane dioxide. Many other epoxides can be used, but the alkylene oxides containing 2 to 6 carbon atoms are generally used either alone or in admixture.

Catalysts for the reaction of the oxirane ring compounds and phenolphthalein are alkali or alkaline earth hydroxides, primary amines, secondary amines, tertiary amines, or basic alkali salts. These include sodium, potassium, lithium, calcium and barium hydroxides, amines such as methyl, dimethyl, diethyl, trimethyl, triethyl, tripropyl, dimethyl benzyl, dimethyl hydroxyethyl, dimethyl-2-hydroxypropyl amines, and the like, and salts of strong bases and weak acids such as sodium acetate or benzoate. Combinations of catalysts can be used to excellent advantage in obtaining particular products. For example, an amine catalyst, such as triethylamine, can be used to add the first two moles of propylene oxide to the compound, and thereafter hydroxyalkylation can be continued with ethylene oxide using as a catalyst an alkali metal hydroxide, such as sodium hydroxide. In general, the hydroxyalkylation reaction can be carried out at 50 to 250 degrees centigrade. The hydroxyalkylation is preferably performed at 50 to 150 degrees centigrade. Solvents are generally preferred, for example, 1,2-dioxane, 1,4-dioxane, dimethylformamide and diethylformamide.

Hydroxyalkylation can also be carried out with alkylene halohydrins using equivalent amounts of an alkali metal hydroxide to bring about the reaction. Suitable alkylene halohydrins are ethylene chloro- or bromohydrins, propylene chloro- or bromohydrins, 2,3-butylene chloro- or bromohydrins, glyceryl chloro- or bromohydrins.

Another method for hydroxyalkylation is by reaction with alkylene carbonates such as ethylene carbonate and propylene carbonate, using a catalyst such as sodium or potassium carbonate.

In the preparation of the compounds of the invention, it is generally preferred that all phenolic hydroxyl groups be reacted. However, products prepared by reaction with a number of units of hydroxyalkylation agent per mole of phenolic hydroxyl are often desired, since the physical properties of the compounds and the polymers in which they are employed can be adjusted by controlling the ether chain length. Also, the hydroxyl number of the compounds can be adjusted by controlling the ether chain length. Thus, the length of the ether chain determines whether polyurethane foams made with the compounds of the invention are rigid, semirigid or flexible. Generally, for rigid foams, it is not desired to react more than ten moles of the hydroxyalkylation agent per mole of phenolic hydroxyl. It is often desirable to hold the ether chain length to a minimum so that the physical properties of the foams are maximized. The principal criterion is that the length of the ether chain is selected to give the desired balance between the viscosity of the condensation product and the physical properties of the finished foam. In the production of flexible foams, the required ether chain length is dependent on the molecular weight of the phenol-aldehyde or phenol-ketone condensate, but is usually less than 25 units of hydroxyalkylation agent per mole of phenolic hydroxyl, and generally does not exceed about 100 units per mole. The hydroxyl number of the compounds of the invention is generally in the range of 200 to 950 when the compounds are used for rigid foams, and 30 to 200 when the compounds are used for flexible to semirigid foams.

Ammonia and suitable amines of the formula $NH_2R'$ are useful including the aliphatic monoamines having 1 to 8 carbon atoms in the aliphatic radicals, such as methylamine, ethylamine, propylamine, isopropylamine, butylamine, amylamine, hexylamine, and cyclohexylamine. Also useful are the aryl amines such as aniline, alkyl-substituted anilines such as para-toluidine, ortho-toluidine, xylidene, and the like. Diamines such as hexamethylene diamine can also be employed. The preferred amine compounds are the monoalkanolamines such as those having the formula:

$$(H)_2NR'-XH$$

wherein X is oxygen or sulfur and the organic radical R' is an alkyl group having up to 8 carbon atoms. Typical amines for use in preparing the compounds of the invention are ethanolamine, 2-aminopropanol, 3-aminopropanol, 2-aminobutanol, 3-aminobutanol, 4-aminobutanol, mercapto-2-ethylamine, mercapto-2-propylamine, and the like.

At least the stoichiometric proportion of the ammonia or the desired amine is employed to react with the phenolphthalein, but an excess of ammonia or the amine can be employed. The reaction can be conducted at a temperature in the range of 5 to 100 degrees centigrade, preferably 25 to 75 degrees centigrade. An inert, liquid diluent, such as dimethylformamide, diethylformamide, 1,2-dioxane, 1,4-dioxane, and the like, can be employed, if desired. Atmospheric pressure is usually employed, although superatmospheric pressure or vacuum can be used if desired. The reaction time can be varied from one to two minutes up to an hour or more. The phenolphthalein and ammonia or amine react in a 1:1 molar ratio to produce the amide derivative.

The amine derivatives are useful as intermediates in the preparation of polymer compositions, such as polyurethane foams.

Compounds resulting from the reaction of compounds of Formulae I and II with oxyalkylation agents are useful in the preparation of polymer compositions. The oxyalkylation agents can be mono oxirane ring compounds, alkylene halohydrins and alkylene carbonates of the type illustrated hereinbefore.

Preparation of polyurethane compositions

The reaction product of Compositions I and II are useful in the preparation of polyurethane compositions by reaction of the compounds with organic polyisocyanates. Various organic polyisocyanates can be used in preparing the polyurethane compositions of the invention. Among these isocyanates are 2,4-tolylene diisocyanate, 2,6-tolylene diisocyanate, and mixtures thereof, and particularly the crude mixtures thereof that are commercially available. Other typical polyisocyanates include methylene-bis(4-phenylisocyanate), n-hexyl diisocyanate, 1,5-naphthalene diisocyanate, 1,3-cyclopentylene diisocyanate, p-phenylene diisocyanate, 2,4,6-tolylene triisocyanate, 4,4',4"-triphenylmethane triisocyanate. Higher isocyanates are provided by the liquid reaction products of (1) diisocyanates and (2) polyols or polyamines, and the like. In addition, isothiocyanates and mixtures of isocyanates can be employed. Also contemplated are the many impure or crude polyisocyanates that are commercially available. Especially preferred for use in the invention are the polyaryl polyisocyanates having the following generalized formula:

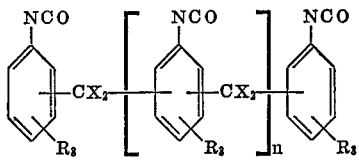

wherein $R_3$ is selected from the group consisting of hydrogen, chlorine, bromine, alkyl, having 1 to 5 carbon atoms, and alkoxy having 1 to 5 carbon atoms;

X is selected from the group consisting of hydrogen, alkyl having 1 to 10 carbon atoms and phenyl; and $n$ has an average value of at least 1 and generally about 1 to 3.

The preferred composition of this type is polymethylene polyphenylisocyanate which is a mixture of compounds having the following generalized formula:

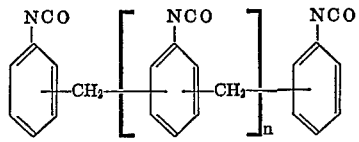

wherein $n$ has an average value of at least 1 and generally is from 1 to 3. Other typical compounds of this type include those wherein the $R_5$ groups are chlorine, bromine, methyl or methoxy, and wherein the value of X is methyl or phenyl in the generic formula.

Any foaming agent commonly used in the art can be employed. These are generally materials that are capable of liberating gaseous products when heated, or when reacted with an isocyanate. Preferably, foaming is accomplished by introducing a low boiling liquid into the resin. The heat of reaction is then sufficient to expand the mixture to a foam stable enough to retain its shape until the resin gels. Suitable liquids are the fluorochlorocarbons boiling in the range of $-30$ to 50 degrees centigrade and mixtures thereof, for example, trichlorofluoromethane, trichlorofluoroethane, difluoromonochloroethane, and difluorodichloroethane. Also useful are mixtures of the fluorocarbons with chlorocarbons such as methylene chloride. Another class of foaming agents that is suitable for carrying out the foaming reaction at an elevated temperature is a tertiary alcohol in combination with a strong concentrated acid catalyst. Examples of tertiary alcohols include tertiary amylalcohol, tertiary butyl alcohol, and the like. Examples of catalysts include sulfuric acid and aluminum chloride. Other foaming agents that can be used include the following: polycarboxylic acids, polycarboxylic acid anhydrides, dimethylol ureas, polymethylol phenols, formic acid and tetrahydroxymethylphosphonium chloride.

If desired, a reaction catalyst can be employed in preparing the polyurethane compositions of the invention. Generally, but not necessarily, catalysts are employed to prepare the polyurethane foams having densities up to about 6 pounds per cubic foot. For foam products having densities of 6 pounds per cubic foot and higher, or when acid phosphorus additives are used, reaction catalysts are generally not needed. The catalysts employed can be any of the known conventional catalysts for isocyanate reactions, such as the tertiary amines. Many such compounds are useful in the reaction, but they generally have up to 20 carbon atoms. Typical compounds of the trialkylamines are trimethylamine, triethylamine, diethylenetriamine, tetramethyl butane diamine, and the like. Also suitable are the morpholine compounds such as N-methyl morpholine, N-acetyl morpholine, 4,4'-dithio morpholine, and the like, and the tertiary amine compounds have other functional groups such as diethyl ethanolamine, methyl diethanolamine, N-diethyl aminoacetic acid, methyl aminodipropionic acid, N-methyl dipropylenetriamine, dimethyl piperazine, and the like. The preferred amine compounds are triethylamine and tetramethyl guanidine. Other urethane catalysts are also useful, for example, the antimony compounds, such as antimony caprylate, antimony naphthenate, and antimonous chloride; the tin compounds such as dibutyltin dialaurate, tri-n-octyltin oxide, hexabutylditin, tributyltin phosphate or stannic chloride.

In preparing the polyurethane compositions of this invention, the components are preferably reacted in a ratio sufficient to provide about 85 to 115 percent of isocyanato groups with respect ot the total number of hydroxyl and equivalent groups, e.g., amino, anhydride, and carboxyl groups present in the hydroxy-containing polymeric material (and the foaming agent, if one is provided). The reaction temperature generally ranges from about 20 to about 180 degrees centigrade, although higher and lower temperatures can be used.

Various additives can be incorporated in the polyurethane composition to modify the properties thereof. For example, the fire resistance of the composition can be further improved by the addition of an antimony compound. Fillers, such as clay, calcium sulfate or ammonium phosphate can be added to lower the cost; components, such as dyes, can be added for color, and fibrous glass, asbestos and synthetic fibers can be added to improve strength characteristics. Surfactants are generally employed to control cell structure. Suitable cell controllers are the silicone-glycol copolymers, such as triethoxy dimethyl polysiloxane copolymerized with a dimethoxypolyethylene glycol.

Especially useful in combination with the reaction product of Compositions I and II of the invention in the preparation of polymer compositions are organic phosphorus compounds which are capable of imparting fire retardance to the polymer compositions. Suitable phosphorus compounds include the neutral and acid pohsphorus compounds such as those disclosed in U.S. Pat. No. 3,257,337. Also useful are the phosphorus compounds such as those disclosed in copending application Ser. No. 370,705, filed May 27, 1964. The phosphorus compounds are generally employed in a proportion from about 1 part up to about 20 parts by weight per 100 parts of the total weight of the hydroxyl-containing components. The preferred amount of phosphorus compound is from about 2 to about 10 parts by weight per 100 parts of the total weight of the hydroxyl-containing components.

Frequently, it is desired to blend the reaction product of Compounds I and II with one or more additional hydroxyl-containing compounds, especially polymeric materials, to obtain a combination of properties resulting from both types of polyhydric compositions. However, the compounds of the invention should comprise at least about 20 weight percent of the total hydroxyl-containing components. The auxiliary hydroxyl-containing polymeric materials generally have a hydroxyl number between about 25 and 950 and are polyester, polyethers, and mixtures thereof. The polyesters are the reaction products of a polyhydric aclohol and a polycarboxylic compound, said polycarboxylic compound being either a polycarboxylic acid, a polycarboxylic acid anhydride, a polycarboxylic acid ester, a polycarboxylic acid halide, or mixtures thereof. The carboxylic compounds can be aliphatic, cycloaliphatic, aromatic, or heterocyclic and either saturated or unsaturated. Among the polycarboxylic compounds which can be used to form the polyester are maleic acid, fumaric acid, phthalic acid, isophthalic acid, terephthalic acid, tetrachlorophthalic acid, aliphatic acids such as oxalic, malonic, succinic, glutaric and adipic, 1,4-cyclohexadiene-1,2-dicarboxylic acid, and the like. Additional polycarboxylic compounds which can be used to form the polyester are Diels-Alder adducts of hexahalocyclopentadiene and a polycarboxylic compound containing aliphatic carbon-to-carbon unsaturation, wherein the halogen is selected from the group consisting of chlorine, bromine, fluorine, and mixtures thereof, for example, 1,4,5,6,7,7-hexachlorobicyclo-(2.2.1)-5-heptene-2,3-dicarboxylic acid, 1,4,5,6-tetrachloro - 7,7 - difluorobicyclo-(2.2.1)-5-heptene-2,3-dicarboxylic acid, 1,4,5,6,7,7-hexabromobicyclo-(2.2.1)-5-heptene - 2,3 - dicarboxylic acid, 1,4,5,6-tetrabromo - 7,7 - difluorobicyclo-(2.2.1)-5-heptene-2,3-dicarboxylic acid, and the corresponding acid anhydrides, acid halides and acid esters. Mixtures of any of the above polycarboxylic compounds can be employed.

At least a portion of the total polyhydric alcohol component should comprise a polyhydric alcohol containing at least three hydroxyl groups when rigid foams are desired. Where a very rigid structure is desired, the entire alcohol component can comprise a trifunctional alcohol such as glycerol. Where a less rigid foam product is desired, a difunctional polyhydric alcohol such as ethylene glycol or 1,4-butanediol can be utilized as part of the polyhydric alcohol component. Suitable polyfunctional alcohols include diethylene glycol, propylene glycol, polypropylene glycols, polybutylene glycols, glycerol, hexanetriol, trimethylolpropane, trimethylolethane, mannitol, cyclohexanediol - 1,4, glycerol monoethyl ether and the like. The ratio of the polyhydric alcohol such as glycerol to the polybasic acid can be expressed as the hydroxyl-carboxyl ratio, which can be defined as the number of moles of hydroxyl groups to the number of moles of carboxyl groups in a given weight of resin. This ratio can be varied over a wide range. Generally, however, a hydroxyl-carboxyl ratio of between 1.5:1 to 5:1 is needed.

The polyethers employed are known in the art, and are the reaction products of (1) either a polyhydric alcohol, a polycarboxylic acid or a polyphenolic compound, and (2) a monomeric 1,2-epoxide possessing a single 1,2-epoxy group, such as, for example, propylene oxide. The polyhydric alcohols, polycarboxylic acids and epoxides which can be employed are any of the polyhydric alcohols, polycarboxylic acids and epoxides listed hereinbefore. Polyphenolic compounds which can be employed are the reaction products of phenolic compounds with aldehydes, such as phenol-formaldehyde novolac resins.

The following resin formulations are typical hydroxyl-containing polymeric materials that can be used as auxiliary components in the polyurethane compositions of this invention:

Resin A:
  6 moles 1,4,5,6,7,7-hexachlorobicyclo-(2.2.1)-5-heptene-2,3-dicarboxylic acid
  12 moles trimethylolpropane
  Acid number: less than 10
  Hydroxyl number: 365
Resin B:
  6 moles adipic acid
  10 moles trimethylolpropane
  Acid number: less than 1
  Hydroxyl number: 504
Resin C:
  Polypropylene glycol
  Molecular weight: about 2000
  Hydroxyl number: 56
Resin D:
  3 moles adipic acid
  5 moles glycerol
  Acid number: 1
  Hydroxyl number: 640
Resin E:
  1 mole trimethylolpropane
  6 moles propylene oxide
  Hydroxyl number: 392
Resin F:
  8.8 moles trimethylolpropane
  5 moles adipic acid
  1 mole phthalic anhydride
  Acid number: less than 1
  Hydroxyl number: 435

Preparation of polyester resins

The hydroxyl containing reaction product of compounds of Formulas I and II are useful in the preparation of saturated polyester resins, i.e., alkyd resins, and unsaturated polyester resins. The hydroxyl-containing compound of the invention, either alone or in admixture with other polyhydric compounds, is reacted with a polycarboxylic compound, such as a polycarboxylic acid, polycarboxylic anhydride, polycarboxylic acid halide or polycarboxylic acid ester.

The saturated polycarboxylic compounds useful in the preparation of either the saturated or unsaturated polyesters can be aliphatic, cycloaliphatic, aromatic or heterocyclic. Illustrative of these polycarboxylic acids, acid anhydrides, acid halides and acid esters are phthalic, isophthalic, terephthalic tetrachlorophthalic, adipic, succinic, and mixtures thereof. Suitable unsaturated polycarboxylic acids having aliphatic carbon-to-carbon double bonds, and the corresponding acid halides, esters and anhydrides include maleic, chloromaleic, ethylmaleic, itaconic, citraconic, zeronic, pyrochinchoninic and acetylene dicarboxylic, either alone or in mixtures.

Suitable saturated polyhydric alcohols for use in combination with the polyhydric compounds of the invention include ethylene glycol, diethylene glycol, propylene glycol, dipropylene glycol, butane diol, pentane diol, hexane diol, glycerol, mannitol, sorbitol, bisphenols, substituted bisphenols, hydrogenated bisphenols and mixtures thereof. Unsaturated polyhydric alcohols can also be used in combination with the hydroxyl-containing compounds of the invention and the preparation of polyester resins. Suitable compounds include butene diol, pentene diol, the unsaturated hydroxy ethers such as allyl or vinyl, glycerol ethers, diol or allyl pentaerythritol ethers and the like.

The properties of polyesters can be varied by using mixtures of the various types of acids and alcohols. Also it is possible to render the polyester compositions fire retardant by the incorporation therein of suitable halogen-containing compounds such as the Diels-Adler adducts of hexahalocyclopentadiene and a polycarboxylic compound containing aliphatic carbon-to-carbon unsaturation, such as those disclosed hereinbefore with respect to the preparation of the polyurethane compositions. Tetrachlorophthalic anhydride and tetrabromophthalic anhydride can also be usefully employed.

The temperature for the reaction between polyhydric alcohols and polybasic acids ranges from about 100 to 200 degrees centigrade, although higher and lower temperatures can be employed. Esterification catalysts such as para-toluene sulfonic acid, benzene sulfonic acid, beta-naphthalene sulfonic acid and the like, or amines such as pyridine, triethyl amine, quinoline and the like can be added to the reaction mixture. The proportion of polyhydric alcohols is approximately controlled by the total low proportion of acids in the esterification reaction mixture. It is preferred to react the polyhydric alcohols and polybasic acids in roughly equimolar proportion, however, either the acids or alcohols can be used in substantial excess, if it is desired to form a low molecular polyester resin.

The unsaturated polyester resins of the invention can be cured or cross-linked with a variety of ethylenically unsaturated monomers. The vinylidene monomers useful in curing the thermoplastic unsaturated polymers include vinylic compounds or mixtures thereof capable of cross-linking ethylenically unsaturated polymer chains at their points of unsaturation. Usually they contain the reactive groups $H_2C=C<$. Specific examples include styrene, chlorostyrenes, methyl styrenes such as alpha methyl styrene, p-methyl styrene, divinyl benzene, indene, unsaturated esters such as: methyl methacrylate, methyl acrylate, allyl acetate, diallyl phthalate, diallyl succinate, diallyl adipate, diallyl sebacate, diethylene glycol bis(allyl carbonate), triallyl phosphate and other allyl esters, and vinyl toluene, diallyl chlorendate, diallyl tetrachlorophthalate, the lower aliphatic esters other than methyl of methacrylic and acrylic acids, ethylene glycol diacrylate, dimethacrylate, diethacrylate, etc. The monomer may be admixed in the polymer in an amount sufficient to produce a thermoset polymer and the admixture heated to an elevated temperature in the presence of a suitable catalyst to cross-link or cure the polymer. With proper catalyst systems, such as cobalt naphthenate and methylethyl ketone peroxide, room temperature cures are obtained.

The proportion of olefinic cross-linking agent to unsaturated polyester can be varied within the ultimate limits of each without departing from the scope of the invention, necessary to produce as infusible, insoluble, polyester resin. In general, the concentration of the unsaturated polyester in the olefinic cross-linking agent can vary between about ten and ninety percent. Polymerization catalyst are preferably added to the mixture of unsaturated polyester and olefinic cross-linking agent to effect setting or curing. Catalysts such as benzoyl peroxide, acetyl peroxide, lauryl peroxide, methylethyl ketone peroxide, cumene hydroperoxide, and the like, are satisfactory. Such catalysts are used in proportions of 0.01 to ten percent of the total resin, depending on the efficiency of their action and whether or not substances which inhibit polymerization are present in the mixture. The polymerization reaction can also be hastened by adding promoters such as metals or metal salts, cobalt resinates, cobalt maleate, cobalt naphthenate and the like, or amines such as dibutylamine, or mercaptans such as dodecyl mercaptan. These are used in proportions similar, or smaller to, those stated for the catalysts.

The polyester resins of the invention can be used in the preparation of coatings of various types, laminates, castings and moldings. Various additives can be incorporated in the polyester resins, such as antimony compounds such as antimony oxide, to render them more fire retardant. Fillers such as clay, calcium sulfate or ammonium phosphate, fibrous glass, asbestos, synthetic fibers, pigments and dyes can also be used as additives.

The following examples illustrate the various aspects of the invention but are not intended to limit it. When not otherwise specified, temperatures are given in degrees centigrated, and parts are by weight.

EXAMPLE 1

291.4 parts by weight of phenolphthalein and 150 parts by weight of dimethyl formamide were charged to a reaction vessel. Thereafter, 17 parts by weight of ammonia were introduced to the reactor beneath the surface of the reaction mixture at a temperature of about 35 to 40 degrees centigrade. The resulting product was a bright red, viscous liquid.

444 parts by weight of the thus-produced compound in solution in dimethylformamide were introduced to a heated autoclave. The temperature was adjusted to 67 degrees centigrade and ethylene oxide was introduced to the autoclave at such a rate that a pressure of 45 to 60 pounds per square inch gauge was maintained. During the course of the reaction, the temperature of the reaction mixture rose to 139 degrees centigrade. After the addition of 376 parts by weight of ethylene oxide, the temperature of the reaction mixture was decreased to 95 degrees centigrade. The dimethyl formamide was vacuum distilled at 160 degrees centigrade and 1 millimeter of mercury absolute pressure for one-half hour. There were produced 656 parts by weight of a clear, amber-colored resin having a molecular weight of 351, a nitrogen content of 2.18 weight percent, a hydroxyl number of 230. The resin was substantially free of phenolic hydroxyl groups as determined by analysis for nitrogen content and hydroxyl number (calculated nitrogen content: 2.14 weight percent, calculated hydroxyl number: 252).

EXAMPLE 2

75 parts by weight of phenolphthalein and 600 parts by weight of a 30 weight percent aqueous solution of ammonium hydroxide were charged to an autoclave and heated to 170 degrees centigrade at 390 pounds per square inch gauge for approximately 1.5 hours. The reactor temperature was allowed to cool gradually. The reactor contents were discharged to a distillation apparatus and the unreacted ammonia was distilled from the reaction product at 80 degrees centigrade, under a moderate vacuum. During the distillation, a dark resinous material precipitated from solution. The precipitate was removed from the aqueous phase and dried to yield 53 parts by weight of a brown, brittle solid product. The product of the reaction had a melting point of 153–158 degrees centigrade, a nitrogen content of 4.52 weight percent and contained 10.65 weight percent phenolic hydroxyl (calculated nitrogen content: 4.4 weight percent, calculated phenolic hydroxyl 10.7 weight percent).

316 parts by weight of the thus produced compound and 200 parts by weight of dimethylformamide were charged into a reaction vessel equipped with an agitator, thermometer, condenser and gas inlet tube. The mixture was heated to 160 degrees centigrade. Then propylene oxide was introduced as a vapor beneath the surface of the liquid until 196 parts by weight had been added. After the reaction was complete, the dimethylformamide solvent was evaporated from the reaction mixture under vacuum to produce an amber colored resin.

EXAMPLE 3

A polyurethane foam was produced by first blending 100 parts by weight of the product of Example 2, 35 parts by weight of trichlorofluoromethane, 0.5 part by weight of the cell controller prepared in accordance with the disclosure of U.S. Pat. No. 2,824,748 and 1 part by weight of triethylamine catalyst. The foregoing blend of components was mixed with 95 parts by weight of polymethylene polyphenylisocyanate with vigorous agitation and dispensed into a mold. The resulting polyurethane foam was cured and found to have a density of 2.3 pounds per cubic foot, a compressive yield of 23.4 pounds per square inch and to undergo a 28 percent increase in volume on exposure to a 100 percent relative humidity environment for one week at 70 degrees centigrade.

The polyurethane foams produced from the compounds of the invention have good physical properties such as mechanical properties, e.g., compressive strength and the like, good thermal properties, e.g., low weight and volume change on exposure to dry and humid heat, and good 5 percent volume expansion temperature, and good fire retarding characteristics. Thus, it is found that the mere addition of a small proportion of a phosphorus compound renders polyurethan foams made with compounds of the invention (non-burning) when tested in accordance with ASTM test D1692.

EXAMPLE 4

To the resin of Example 2 were added 146 parts by weight of adipic acid and 1.5 parts by weight of paratoluene sulfonic acid. The temperature of the reaction mixture was raised to 180 degrees centigrade, during which time 27 parts by weight of water were removed from the reaction mixture. The resulting polyester resin was recovered and used to draw thin, flexible films.

While this invention has been described with reference to certain specific embodiments, it will be recognized by those skilled in the art that many variations are possible without departing from the spirit and scope of the invention.

What is claimed is:

1. The product prepared in the presence of a catalytic amount of a compound selected from the group consisting of alkali metal hydroxides, alkaline earth hydroxides, primary amines, secondary amines, tertiary amines, and basic alkali salts by reaction of a compound selected from the group consisting of ($A_1$) a mono-oxirane ring compound and ($A_2$) an alkylene carbonate, with the reaction product of (B) $NH_2R'$ wherein R' is selected from the group consisting of hydrogen, hydrocarbyl, hydroxy-substituted hydrocarbyl and mercapto-substituted hydrocarbyl, with (C) a compound of the formula:

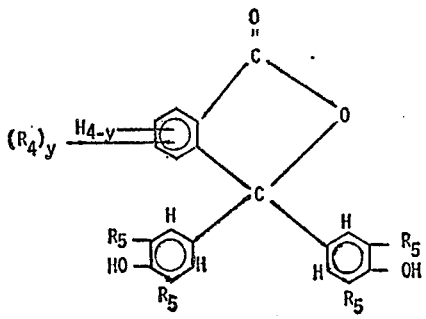

wherein y is a number from 0 to 4, $R_4$ is selected from the group consisting of chlorine, bromine and alkyl of 1 to 12 carbon atoms, and y is 1 to 4 when $R_4$ is chlorine or bromine and y is 1 when $R_4$ is alkyl and $R_5$ is selected from the group consisting of hydrogen, chlorine, bromine, iodine and alkyl of 1 to 6 carbon atoms, or the product prepared in the presence of an equivalent amount of an alkali metal hydroxide by reaction of ($A_3$) an alkylene halohydrin with the reaction product of (B) and (C) as defined above.

2. The reaction product of claim 1 wherein the compounds ($A_1$), ($A_2$), and ($A_3$) have 2–6 carbon atoms, $R_5$ is hydrogen and y is zero.

3. The reaction product of claim 1 wherein ($A_1$) is selected from the group consisting of ethylene oxide and propylene oxide, $R_5$ is hydrogen and y is zero.

4. A process for preparing the reaction product of claim 1 which comprises reacting ($A_1$) or ($A_2$) with the reaction product of (B) with (C) in the presence of a catalytic amount of a compound selected from the group consisting of alkali metal hydroxides, alkaline earth hydroxides, primary amines, secondary amines and basic alkali salts.

5. The process of claim 4 wherein (B) is ammonia and ($A_1$) is an alkylene oxide of 2 to 6 carbon atoms.

6. The process of claim 5 wherein the alkylene oxide comprises ethylene oxide and propylene oxide.

7. A process for preparing the reaction product of claim 1 which comprises reacting ($A_3$) with the reaction product of (B) with (C) in the presence of an equivalent amount of an alkali metal hydroxide.

References Cited

FOREIGN PATENTS

39/24,271   11/1964   Japan.

OTHER REFERENCES

Solov'eva et al., Transactions Moskva Khim.-Technolog. Institute 48, 214–217 (1965).

Lee & Neville, "Handbook of Epoxy Resins," pp. 2–19 and 2–30, McGraw-Hill (1967).

WILLIAM H. SHORT, Primary Examiner

E. A. NIELSEN, Assistant Examiner

US. Cl. X.R.

260—325